United States Patent
Chang et al.

(10) Patent No.: US 6,274,025 B1
(45) Date of Patent: Aug. 14, 2001

(54) CHEMICAL APPROACH TO DEVELOP LIFT-OFF PHOTORESIST STRUCTURE AND PASSIVATE MR SENSOR

(75) Inventors: Jei-Wei Chang, Cupertino; Shou-Chen Kao, Fremont; Cherng-Chyi Han, San Jose; Kochan Ju, Fremont; Mao-Min Chen, San Jose, all of CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/332,433

(22) Filed: Jun. 14, 1999

(51) Int. Cl.[7] .................................................. C25D 5/02
(52) U.S. Cl. .................................... 205/118; 205/122
(58) Field of Search ...................... 205/122, 118, 205/119; 216/40, 22

(56) References Cited

U.S. PATENT DOCUMENTS

| | | | |
|---|---|---|---|
| Re. 34,099 | * 10/1992 | Krounbi et al. | 360/113 |
| 4,782,414 | * 11/1988 | Krounbi et al. | 360/113 |
| 5,256,249 | 10/1993 | Hsie et al. | 156/656 |
| 5,491,600 | 2/1996 | Chen et al. | 360/113 |
| 5,568,335 | 10/1996 | Fontana et al. | 360/113 |
| 5,658,469 | * 8/1997 | Jennison | 216/22 |
| 5,747,198 | 5/1998 | Kamijima | 430/11 |
| 5,763,108 | * 6/1998 | Chang et al. | 428/694 R |
| 5,901,432 | * 5/1999 | Armstrong et al. | 29/603.14 |
| 6,103,073 | * 8/2000 | Thayamballi | 204/192.2 |

* cited by examiner

Primary Examiner—Kathryn Gorgos
Assistant Examiner—Erica Smith-Hicks
(74) Attorney, Agent, or Firm—George O. Saile; Stephen B. Ackerman; William J. Stoffel

(57) ABSTRACT

A method to form a passivation layer over a MR Sensor so that the passivation layer defines the track width. The passivation layer is formed simultaneously with the development of the lift off structure in a novel developing/oxidizing solution that oxidizes the MR sensor and develops the photoresist. The passivation layer is an electrical insulator that prevents sensor current from shunting through the overspray of the leads and a heat conductor to allow MR heat to dissipate through the overspray. The method comprises: spinning-on and printing a lift-off photoresist structure over the MR sensor. Next, the lift-off photoresist structure is developed. The MR sensor is anodized in a developing/oxidizing solution to: (1) remove portions of the lower photoresist and (2) to form a (e.g., thin NiFeO) passivation layer on the MR layer at least partially under the upper photoresist layer. The passivation layer is etched to remove the passivation layer not covered by the lift-off structure. Then, a lead layer is deposited over the passivation layer and MR sensor. The lift-off structure is removed.

14 Claims, 2 Drawing Sheets

CHEMICAL APPROACH TO DEVELOP LIFT-OFF PHOTORESIST STRUCTURE AND PASSIVATE MR SENSOR

BACKGROUND OF INVENTION

1) Field of the Invention

This invention relates generally to fabrication of bit lines and more particularly to the fabrication of a Magnetoresistive head (MR) for a Magnetic disk drive and more particularly to a method for forming a passivation layer over a MR sensor layer.

2) Description of the Prior Art

The prior art discloses a magnetic transducer referred to as a magnetoresistive (MR) sensor or head which has been shown to be capable of reading data from a magnetic surface at great linear densities. A MR sensor detects magnetic field signals through the resistance changes of a read element made from a magnetoresistive material as a function of the amount and direction of magnetic flux being sensed by the element.

Current MR heads are manufactured by using a lift-off process to deposit lead layers and define reader track. See e.g., U.S. Pat. No. 5,658,469(Jennison) that shows a lift-off method for improving the photoresist lift-off block shape.

Numerous prior art MR sensors have been developed, and these prior art MR sensors have been effective to meet prior art requirements. However, the drive toward increased recording density has led to the requirement for narrower recording tracks and increased linear recording density along the track. The small MR sensors which are necessary to meet these requirements cannot be made with the use of the prior art techniques.

The importance of overcoming the various deficiencies noted above is evidenced by the extensive technological development directed to the subject, as documented by the relevant patent and technical literature. The closest and apparently more relevant technical developments in the patent literature can be gleaned by considering RE34,099 (Krounbi et al.) that shows an thick insulating layer over a MR sensor.

U.S. Pat. No. 5,256,249(Hsie et al.) discloses a method for forming a MR sensor having a track wide oxide layer overlying the MR sensor.

U.S. Pat. No. 5,658,469(Jennison) shows a method for improving the photoresist lift-off block shape to form a consistent undercut.

U.S. Pat. No. 5,568,335(Fontana et al.), U.S. Pat. No. 5,491,600(Chen et al.) and U.S. Pat. No. 5,747,198 (Kamijima) show a photoresist lift-off processes to form a MR heads.

SUMMARY OF THE INVENTION

It is an object of the present invention to provide a method to form a passivation layer over a MR Sensor so that the passivation layer defines the track width.

It is an object of the present invention to provide a method to form a passivation layer over a MR Sensor so that the passivation layer is formed simultaneously with the development of the lift off structure.

It is an object of the present invention to provide a method to form a passivation layer over a MR Sensor so that the passivation layer is an electrical insulator (prevents MR sensor current from shunting through the overspray and a heat conductor to allow MR heat to dissipate through the overspray.

To accomplish the above objectives, the present invention provides a method to form a passivation layer over a MR Sensor so that the passivation layer defines the track width. A key step of the invention is that the passivation layer is formed simultaneously with the development of the lift off structure in a novel developer/oxidizer solution. The passivation layer is an electrical insulator that prevents Sensor current (I) from shunting through the overspray lead portion and a heat conductor to allow MR heat to dissipate through the overspray.

Key features of the invention are: 1) passivation layer is formed by a chemical process during the development of the photoresist lift-off structure by oxidizing the MR sensor. 2) passivation layer is thin to allow heat to dissipate from the MR sensor but prevents MR current.

Additional objects and advantages of the invention will be set forth in the description that follows, and in part will be obvious from the description, or may be learned by practice of the invention. The objects and advantages of the invention may be realized and obtained by means of instrumentalities and combinations particularly pointed out in the append claims.

BRIEF DESCRIPTION OF THE DRAWINGS

The features and advantages of a recording head according to the present invention and further details of a process of fabricating such a semiconductor device in accordance with the present invention will be more clearly understood from the following description taken in conjunction with the accompanying drawings in which like reference numerals designate similar or corresponding elements, regions and portions and in which.

DETAILED DESCRIPTION OF THE PREFERRED EMBODIMENTS

A. Overview of the Preferred Embodiments of the Invention

The invention is shown in FIGS. 1 to 4. A preferred embodiment is a method to form a passivation layer 20 over a MR Sensor 14 so that the passivation layer defines the track width 16. A key step of the invention is that the passivation layer 20 is formed simultaneously with the development of the lift off structure 24A 24B in a novel developer/oxidizer solution. The passivation layer 20 is an electrical insulator that prevents Sensor current (I) from shunting through the overspray 30A lead 30 portion and a heat conductor to allow MR heat to dissipate through the overspray 30A.

Figure 2:
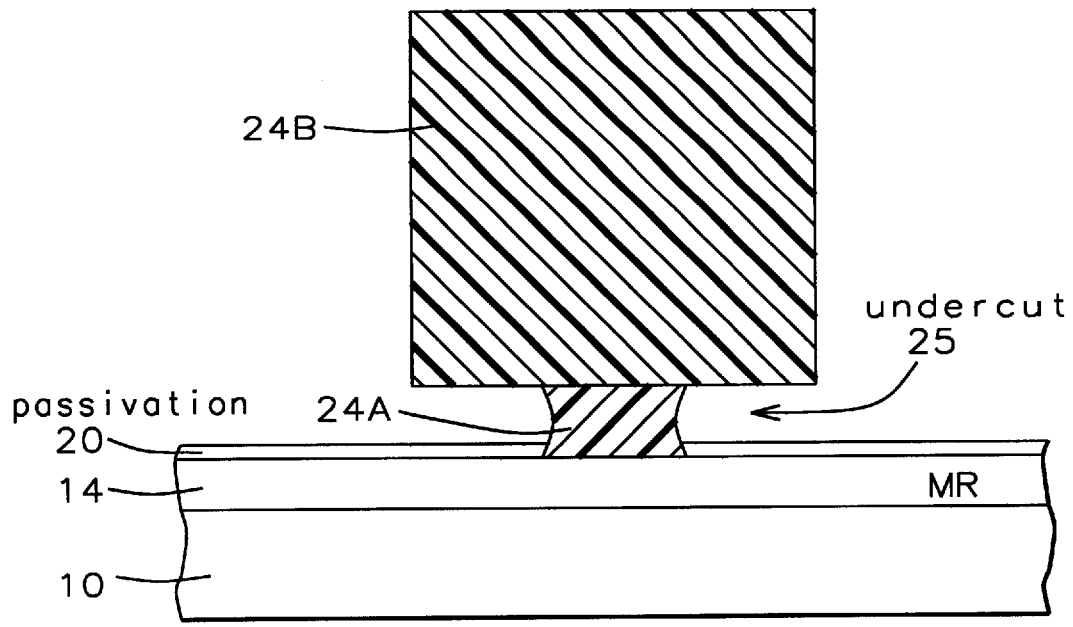
FIG. 2 is a cross sectional view of a MR substrate, MR sensor, and lift-off structure showing the developing of the lower photoresist layer and the creation of the passivation layer according to the method of the present invention.

Key features of the invention are:

1) passivation layer 20 is formed by a chemical process during the development of the photoresist lift-off structure 24A 24B by oxidizing the MR sensor—See FIG. 2.

2) passivation layer 20 is thin to allow heat 40 to dissipate from the MR sensor 14 but prevents MR current 42. See FIG. 4.

B. Problem the Invention Solves—Heat Dissipation from MR Sensor

MR heads are manufactured by using a lift-off process to deposit lead layers and define reader track. In this process, a patterned double photo-sensitive layer structure is built on top to the sensor layer. By selectively photo-developing, the edge of the bottom photo-sensitive layer can be dissolved to formed an undercut structure. When stabilization (exchange layer) and lead layers are physically deposited, the overhang of the top photo-sensitive will block deposition and define the MR reader edge. Unfortunately, the overspray 30A (of the lead layers 30) under the photoresist overhang will cause poor edge definition and product inconsistency. With a decrease in recording track width, the length of overspray (of lead and exchange layers) becomes a fairly large portion of track width and significantly impacts head performance.

Reducing the thickness of the bottom layer of photo resist in the lift-off structure is one approach for eliminating the overspray from the lead/exchange layers. However, the inventors have found that the elimination of the overspray 30A (on the MR) reduces heat dispersion from the edges of the MR sensor. When the MR current increases, heat generated by the MR sensor damages the edge portions of the sensor. The inventor(s) discovery of the heat damage of the MR sensor because of inadequate heat dissipation was a key step towards the invention.

C. Invention Overview

A preferred embodiment of the invention is a method of fabricating a passivation layer 20 over a MR Sensor 14. See FIG. 4. A key feature of the invention is the use of a novel solution to simultaneously (a) develop the lift-off photoresist layer 24A 24B and (b) form the NiFe-passivated insulating layer 20 in the same process step.

The invention teaches an electrochemical method to improve reader edge definition by defining the MR reader stripe width 16 using an etching edge, in contrast with a conventional MR reader stripe that is defined by the deposition of the leads 30. The invention forms a passivation layer 20 under the photoresist lift-off block 24A 24B. Also, the passivation layer 20 is etched so that the passivation layer remains over the read track width of the MR sensor. Next, stabilization and Lead layer 30 are formed over the Sensor and passivation layer through "overspray" 30A.

Figure 1:
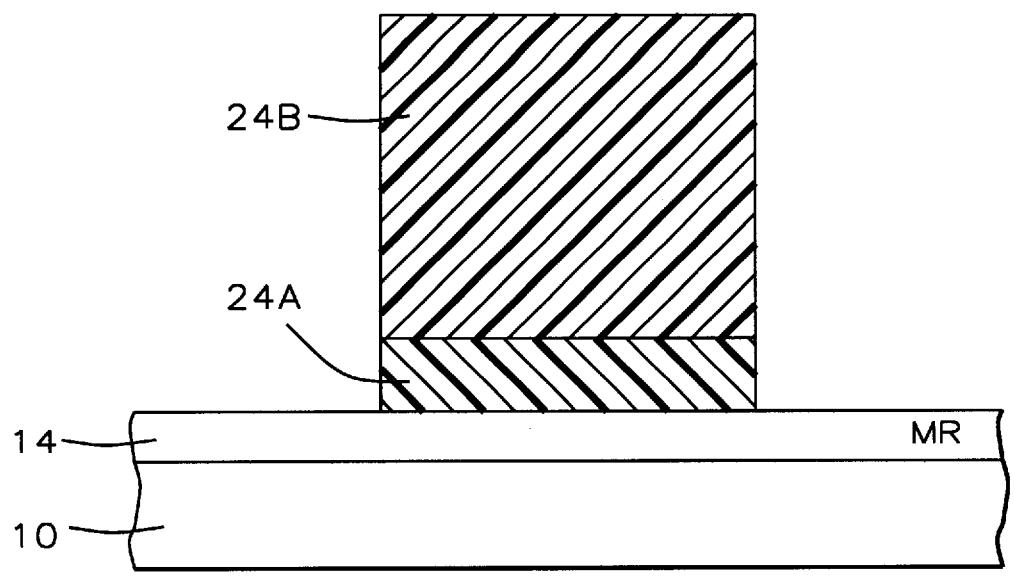
FIG. 1 is a cross sectional view of a MR substrate, MR sensor and lift-off structure according to the method of the present invention.

D. FIG. 1—MR Sensor 14

The invention begins depositing a MR sensor 14 over a substrate 10. The substrate 10 is understood to possibly include a MR substrate, devices formed within the substrate and layers formed on the substrate surface. The MR sensor can be composed of permalloy (NiFe), or NiFeCo and preferably of NiFe. The MR sensor can be formed of any materials that can be oxidized by an electroplating process or galvanic process. The MR sensor can be a multi-layered structure and can be a soft adjacent layer (SAL) MR, dual stripe magnetoresistive (DSMR), single stripe magnetoresistive (SSMR), giant magnetoresistance (GMR).

E. Spinning-on and Printing a Lift-off Photoresist Structure 24A 24B

Still referring to FIG. 1, the next step comprises spinning-on and printing a lift-off photoresist structure 24A 24B over the MR sensor 14. The lift off photoresist structure is preferably comprised of a lower photoresist layer 24A (e.g., pedestal layer) and an upper photoresist layer 24B (e.g., capping layer). The lower photoresist layer has different sensitivities to developer solutions than the upper photoresist layer 24B.

F. Developing the Lift-off Structure and Oxidizing the MR

The key developing/oxidizing step, both (1) develops the lift-off photoresist structure 24A 24B and (2) anodizes the MR sensor 14 forming a passivation layer 20 in a developing/oxidizing solution. The developing/oxidizing solution (1) removes portions of the lower photoresist 24A and (2) forms a (e.g.,thin NiFeO) passivation layer 20 on the MR layer 24A at least partially under the upper photoresist layer 24B.

The developing/oxidizing solution preferably comprises:

(1) developing chemicals to develop the lift-off photoresist structure (preferably KOH, NaOH or MIF (metal ion free such as TMAH (Tetramethylammoniahydroxide).

(2) an oxidization agent capable of oxidizing the MR sensor 14 such as $K_4Fe(CN)_6$, Peroxide, Persulfate or other oxidation agents such as DMAB; and (3) a buffering agent such as Phosphate, borate and other high pH buffering agents such as carbonate, acetate, etc.

TABLE

| component | Chemicals | Most preferred chemical |
|---|---|---|
| photoresist developer | preferably KOH, NaOH or MIF (metal ion free such as TMAH) | TMAH |
| an oxidization agent | such as $K_4Fe(CN)_6$, Peroxide, Persulfate or other oxidation agents such as DMAB | |
| a buffering agent | Phosphate, borate and other high pH buffering agents such as carbonate, acetate. | |

The developing speed of the lower photoresist layer 24A to produce an undercut 25 can be varied with pH and process temperature and the thickness of the passivation layer 20 can be controlled by the strength of passivation agent and temperature.

TABLE

| Preferred passivation/developing process/solution composition. | | | | |
|---|---|---|---|---|
| Process- | units | Low | tgt | hi |
| Composition of passivation solution | M | 0.3M | 0.45M persufate | 0.6M |
| Time | Minutes | 0.1 | 0.5 | 20 |
| pH | | 7 | 10 | 11 |
| temperature | C. ° | 0 | 25 | 50 |

The lift-off structure 24A 24B is preferably immersed a developing/oxidizing solution in a AZ400K by AZ Inc. at a ratio between 1:3 and 1:5 (KOH to $H_2O$) and most preferably about 1:4 and containing ammonium persulfate (tgt=0.5 M preferred range=(0.4 to 0.6 M) or other oxidation agents, at room temperature and a pH buffering agent.

The lower photoresist layer 24A preferably has a thickness of between about 500 and 2000 Å and a width between about 0.1 $\mu$m and 1 $\mu$m. The upper photoresist layer 24B preferably has a thickness in a range of between about 0.5 $\mu$m and 2.0 $\mu$m and a width between about 0.3 and 1.6 $\mu$m. The undercut 25 preferably has a width between about 0.1 and 0.3 $\mu$m.

The lower photoresist layer 24A is preferably composed of PMGI. The upper photoresist layer is preferably composed of Novalak resist.

The passivation layer 20 is preferably composed of NiCr, Ni(OH)$_2$, Cr$_2$O, NiO, NiFeO, or metal hydroxide or metal oxides, Ta, Ti or NiFeO; and is most preferably composed of NiFeO. The passivation layer is preferably a product of the passivation/oxidation of the MR sensor. The passivation layer preferably has a thickness of between about 20 and 100 Å(tgt=50 Å).

It is important to understand that the passivation layer 20 is both an electrical insulator (or has a high resistance layer) and a heat conductor. It is an important understanding that the invention had that an extremely thin passivation layer can effectively electrically insulate the MR 14 from the lead lines 30. In contrast, the prior art forms thick insulating layers over the MR, but these insulating layers are not good heat conductors as they are formed from dielectric materials that require a greater thickness to ensure adequate electrical insulation from Lead 30 to the MR sensor 14.

G. Ion-beam Etching the Passivation Layer 20

Figure 3:
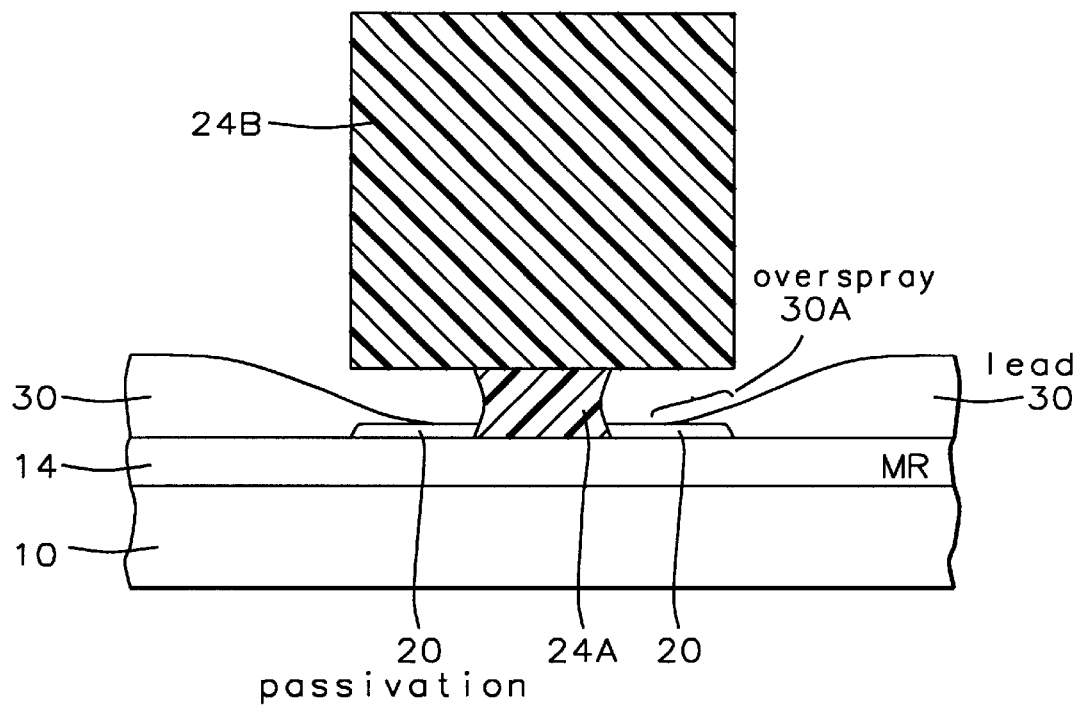
FIG. 3 is a cross sectional view of a MR substrate, MR sensor, and lift-off structure showing the etching of the passivation layer to define the track width according to the method of the present invention.

FIG. 3 shows the step of etching the passivation layer 20 to remove the passivation layer 20 not covered by the lift-off structure 24A 24B. The etching is preferably ion-beam etching and the ions beam etching also redeposits in the undercut 25 (under overhang of the upper photoresist layer 24B) to increase the thickness of the (NiFeO) passivation 20 thickness. The ion beam etch preferably is performed at an angle between 5 and 25 degrees.

The etching of the passivation layer 20 can also be performed by a sputter etching process.

H. Deposit a Lead Layer 30

FIG. 3 also shows next step of the depositing of a lead layer 30 over the passivation layer 20 and MR sensor 14. The lead layer 30 can comprise any combination of stabilizating, pinning and conductive layers as is well known in the art. The lead layer can be formed of various layers of conductive metals. The lead layer 30 is preferably composed of Ta/Au/Ta and preferably has a thickness of between about 300 and 1000 Å. The overspray 30A of the lead layer preferably has a thickness between about 50 and 500 Å and a width between about 0.5 and 0.5 µm.

1. Removing the Lift-off Structure 24A 24B.

Figure 4:
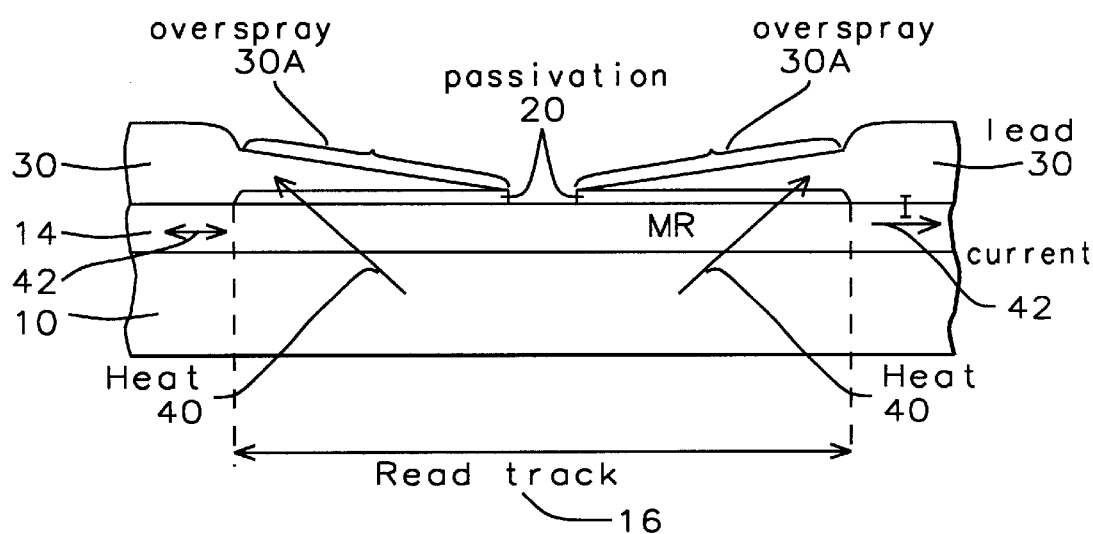
FIG. 4 is a cross sectional view of a MR substrate and MR sensor and lead layers showing the heat dissipation through the passivating layer and blocking of the sense current (I) by the passivation layer to prevent shunting according to the method of the present invention.

Referring to FIG. 4, the lift-off structure 24A 24B is removed. Thus the passivation layer 20 defines a track width 16. The passivation layer 20 is an electrical insulator (or high resistivity layer) that prevents sensor current (I) 42 from shunting through overspray layers 30A while allowing heat 40 to dissipate through to the overspray 30A portion of the lead layer 30.

J. Advantages of the Invention

FIG. 4 shows 2 key advantages of the invention.

(1) The passivation layer 20 prevents shunting of the MR current (I) 42 thru the metal overspray 30A portion of the lead 30. Because of electrical blockage by this high-resistivity passivation layer 20 between MR 14 and lead 30 "overspray" 30A, the MR sensor current (I) will not be shunted by the "overspray" 30A. Thus the read track width 16 is defined by the passivation layer 20 that is etched by the ion beam (see FIG. 3).

(2) The passivation layer 20 allows heat 40 to dissipate through to the overlying overspray 30A and lead layers 30. The metal overspray 30A is a heat conducting channel to disperse sensor heat and improve reliability.

K. Contrast the Invention with Prior Art

The invention has many structural and method differences from Prior art and many advantages over the prior art.

Structural Differences

The invention's passivation layer 20 is composed of an oxidation product of he MR sensor (e.g., NiFe O). The invention's passivation layer is formed by a relatively simple and very manufacturable electrochemical process that is combined with the photoresist liftoff structure development.

The invention's passivation layer is (a) an electrical insulator, but (b) a heat conductor. The invention's passivation layer 20 is preferably composed of NiFeO and has a thickness of between about 50 and 150 Å. In contrast, the Prior art's oxide layer or Ta layer are too thick to conduct heat away from the MR sensor.

Process Differences

The invention's dual development/oxidation step to simultaneously (a) develop undercut 25 in the lower photoresists layer and (b) oxidize the MR 14 to create the passivation layer 20 is unique and saves process steps. The development oxidation step is easy to control and very manufacturable.

The thin passivation layer 20 makes the trimming (e.g., Ion—beam etching or sputter etching feasible.

L. Possible Applications of the Invention

The invention can be applied to many structures such as soft adjacent layer (SAL) (biasing of the MR sensor) MR, single stripe magnetoresistive (SSMR), dual stripe magnetoresistive (DSMR) and giant magnetoresistance (GMR) heads.

It should be recognized that many publications describe the details of common techniques used in the fabrication process of integrated circuit components. Those techniques can be generally employed in the fabrication of the structure of the present invention. Moreover, the individual steps of such a process can be performed using commercially available MR fabrication machines. As specifically necessary to an understanding of the present invention, exemplary technical data are set forth based upon current technology. Future developments in the art may call for appropriate adjustments as would be obvious to one skilled in the art.

The present invention was described in detail with reference to the accompanying drawings. In the description numerous specific details are set forth such as flow rates, pressure settings, thicknesses, etc., in order to provide a more thorough understanding of the present invention. It will be obvious, however, to one skilled in the art that the present invention may be practiced without these details. In other instances, well known process have not been described in detail in order to not unnecessarily obscure the present invention. Also, the flow rates in the specification can be scaled up or down keeping the same molar % or ratios to accommodate difference sized reactors as is known to those skilled in the art.

While the invention has been particularly shown and described with reference to the preferred embodiments thereof, it will be understood by those skilled in the art that various changes in form and details may be made without departing from the spirit and scope of the invention.

What is claimed is:

1. A method of fabricating a passivation layer over a MR Sensor; comprising the steps of:

a) forming an MR sensor over a substrate; said MR sensor is comprised of a material that can be oxidized by an electroplating process or galvanic process;

b) spinning-on and printing a lift-off photoresist structure over said MR sensor; said lift off photoresist structure comprised of a lower photoresist layer and an upper photoresist layer; said liftoff structure defining a read track;

c) developing said lift-off photoresist structure and oxidizing said MR sensor in a developing/oxidizing solution to: (1) remove portions of said lower photoresist layer on said MR sensor; and (2) to form a passivation layer on said MR sensor;

d) etching said passivation layer using said lift-off photoresist structure as a mask to remove areas of said passivation layer not under said lift-off structure;

e) depositing a lead layer on said MR sensor and depositing overspray portions of said lead layer over the passivation layer remaining under said liftoff structure; and f) removing said lift-off structure; wherein said passivation layer defines said track width; said passivation layer is an electrical insulator that prevents sensor current from shunting through overspray layers while allowing heat to dissipate through to said overspray portions of said lead layer.

2. The method of claim 1 wherein said MR sensor is comprised of a material selected from the group consisting of permalloy.

3. The method of claim 1 wherein said passivation layer is composed of a material selected from the group consisting of NiCr, $Ni(OH)_2$, $Cr_2O$, NiO, or metal hydroxide, metal oxides, Ta, Ti and NiFeO.

4. The method of claim 1 wherein said developing/oxidizing solution containing:

(1) developing chemicals to develop said lift-off photoresist structure comprised of a chemical selected from the group consisting of KOH, NaOH, a metal free ion, and TMAH;

(2) an oxidization agent capable of oxidizing said MR sensor selected from the group consisting of $K_4Fe(CN)_6$, Peroxide, and Persulfate; and (3) a buffering agent selected from the group consisting of Phosphate, and borate.

5. The method of claim 1 wherein said developing/oxidizing solution comprises a photoresist developer and ammonium persulfate at a concentration between 0.3 to 0.6 M at room temperature.

6. The method of claim 1 wherein passivation layer preferably has a thickness of between about 20 and 100 Å and is composed of NiFeO.

7. The method of claim 1 wherein said lead layer comprises stabilizing and pinning layers.

8. A method of fabricating a passivation layer over a MR Sensor; comprising the steps of:

a) forming an MR sensor over a substrate; said MR sensor is comprised of a material that can be oxidized by an electroplating process or galvanic process;

b) spinning-on and printing a lift-off photoresist structure over said MR sensor; said lift off photoresist structure comprised of a lower photoresist layer and an upper photoresist layer; said liftoff structure defining a read track;

c) developing said lift-off photoresist structure and oxidizing said MR sensor in a developing/oxidizing solution to: (1) remove portions of said lower photoresist layer on said MR sensor; and (2) to form a passivation layer on said MR sensor; said developing/oxidizing solution comprises:

(1) developing chemicals to develop said lift-off photoresist structure comprised of a chemical selected from the group consisting of KOH, NaOH, a metal free ion, and TMAH;

(2) an oxidization agent capable of oxidizing said MR sensor selected from the group consisting of $K_4Fe(CN)_6$, Peroxide, Persulfate; and (3) a buffering agent selected from the group consisting of Phosphate, and borate;

d) etching said passivation layer using said lift-off photoresist structure as a mask to remove said passivation layer not under said lift-off structure;

e) depositing a lead layer on said MR sensor and depositing overspray portions of said lead layer over the passivation layer; and f) removing said lift-off structure; where by said passivation layer defines said track width; said passivation layer is an electrical insulator that prevents sensor current from shunting through overspray layers while allowing heat to dissipate through to said overspray portions of said lead layer.

9. The method of claim 8 wherein said MR sensor is comprised of NiFe.

10. The method of claim 8 wherein said passivation layer is composed of NiFeO.

11. The method of claim 8 wherein said developing/oxidizing solution containing:

(1) developing chemicals to develop said lift-off photoresist structure comprising of a chemical selected from the group consisting of KOH, NaOH, a metal free ion, and TMAH;

(2) an oxidization agent capable of oxidizing said MR sensor selected from the group consisting of $K_4Fe(CN)_6$, Peroxide, and Persulfate; and (3) a buffering agent selected from the group consisting of Phosphate, and borate.

12. The method of claim 8 wherein said developing/oxidizing solution comprises a photoresist developer and ammonium persulfate at a concentration between 0.3 to 0.6 M at room temperature.

13. The method of claim 8 wherein passivation layer preferably has a thickness of between about 20 and 100 Å and is composed of NiFeO.

14. The method of claim 8 wherein said lead layer comprises stabilizing and pinning layers.

* * * * *